Sept. 19, 1961   P. M. THOMAS ET AL   3,000,520
PROBING DEVICE FOR BLOCK MACHINE PALLET HANDLER
Filed June 30, 1958   4 Sheets-Sheet 1

INVENTORS
PAUL M. THOMAS &
LAWRENCE W. WRIGHT
BY
Willard S. Grow
ATTORNEY

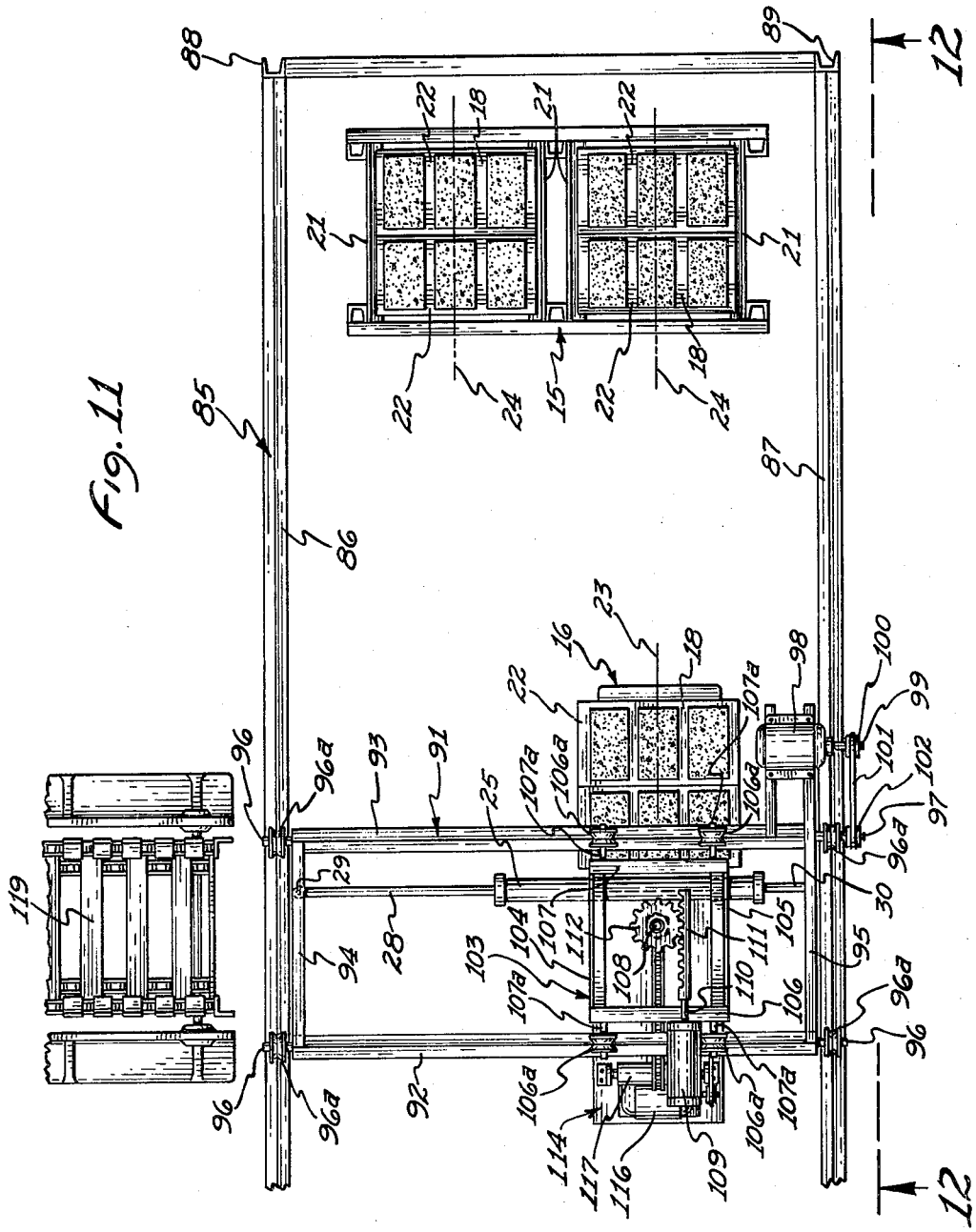

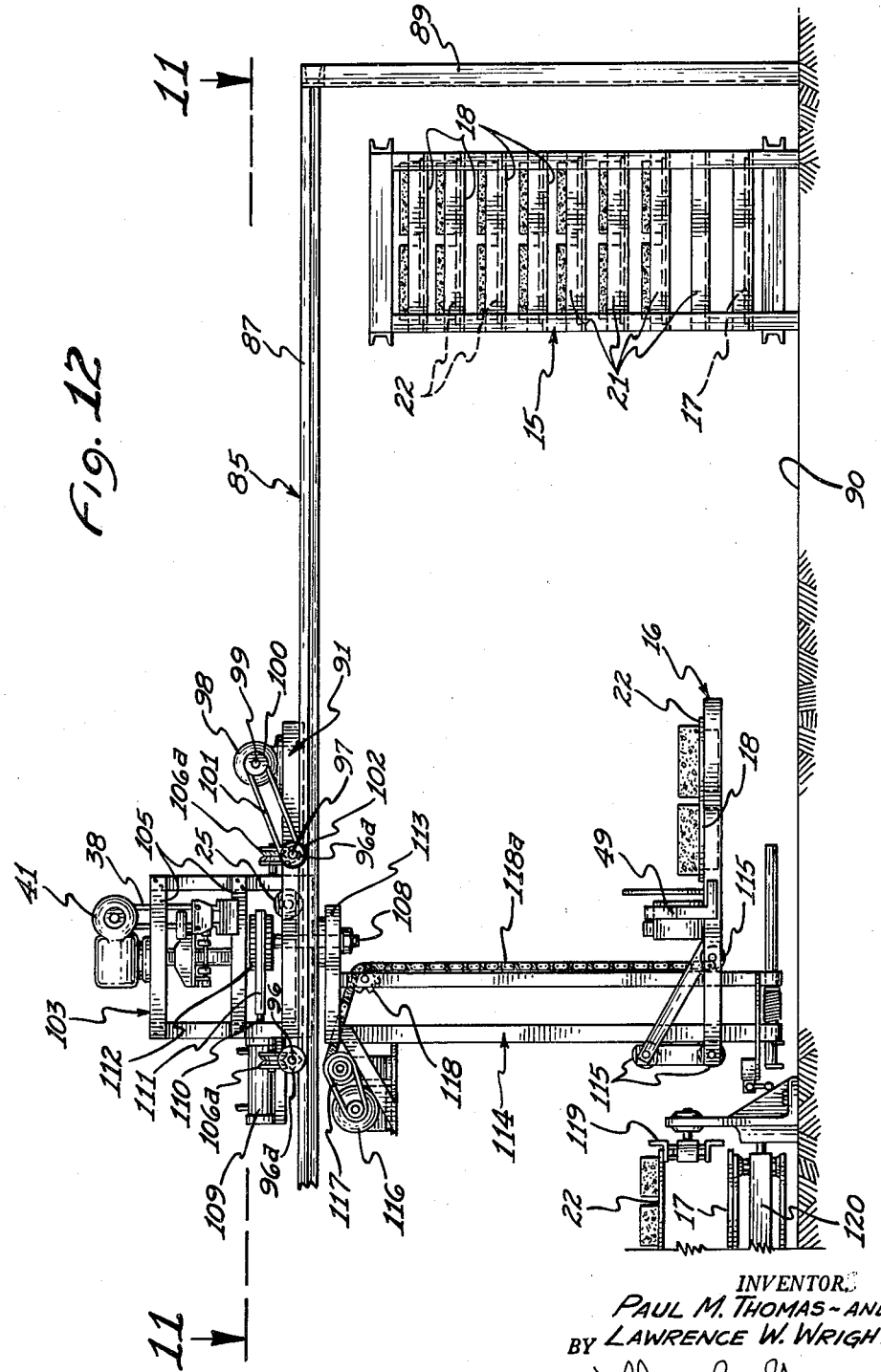

United States Patent Office 3,000,520
Patented Sept. 19, 1961

3,000,520
PROBING DEVICE FOR BLOCK MACHINE
PALLET HANDLER
Paul M. Thomas and Lawrence W. Wright, Phoenix, Ariz.,
assignors to Builders Equipment Company, Phoenix,
Ariz., a corporation of Arizona
Filed June 30, 1958, Ser. No. 745,579
6 Claims. (Cl. 214—16.4)

This invention pertains to improvements in probing devices for concrete block machine pallet handlers.

This device is particularly adapted to use with a pallet handler for concrete block machines such as illustrated in co-pending application Serial No. 707,606 filed January 7, 1958, now patent 2,896,800, issued July 28, 1959.

One of the objects of this invention is to provide an improved probing device for a pallet handler which is simple in construction and highly efficient and sensitive in operation.

Still another object is to provide an electrically operated probing and sensing device for repositioning and accurately aligning the platen of a pallet handler relative to the guide rails of a pallet rack to facilitate placement of the loaded pallets in the rack by the pallet handler.

Another object is to provide a probing device on the pallet handler platen which senses the position of the platen of the pallet handler by engaging the sides of the guide rails of the pallet rack to energize the positioning device to position the platen in the rack to exactly center the platen between said sides of the guide rails so that the platen may accurately pick up an empty pallet and deliver it to a block machine and return with a loaded pallet to the said pair of guide rails and accurately place the loaded pallet on said guide rails.

And a further object is to provide a method of presenting and positioning a pallet handler in a pallet rack to pick up an empty pallet in a predetermined accurate position to facilitate placing the loaded pallets in the rack.

Further features and advantages of this invention will appear from a detailed description of the drawings in which:

FIG. 11 is a fragmentary plan view of a pallet handler showing the environment of this invention on the line 11—11 of FIG. 12.

FIG. 12 is a fragmentary right hand side elevation of the apparatus shown by the line 12—12 in FIG. 11.

Figures 1, 1A:
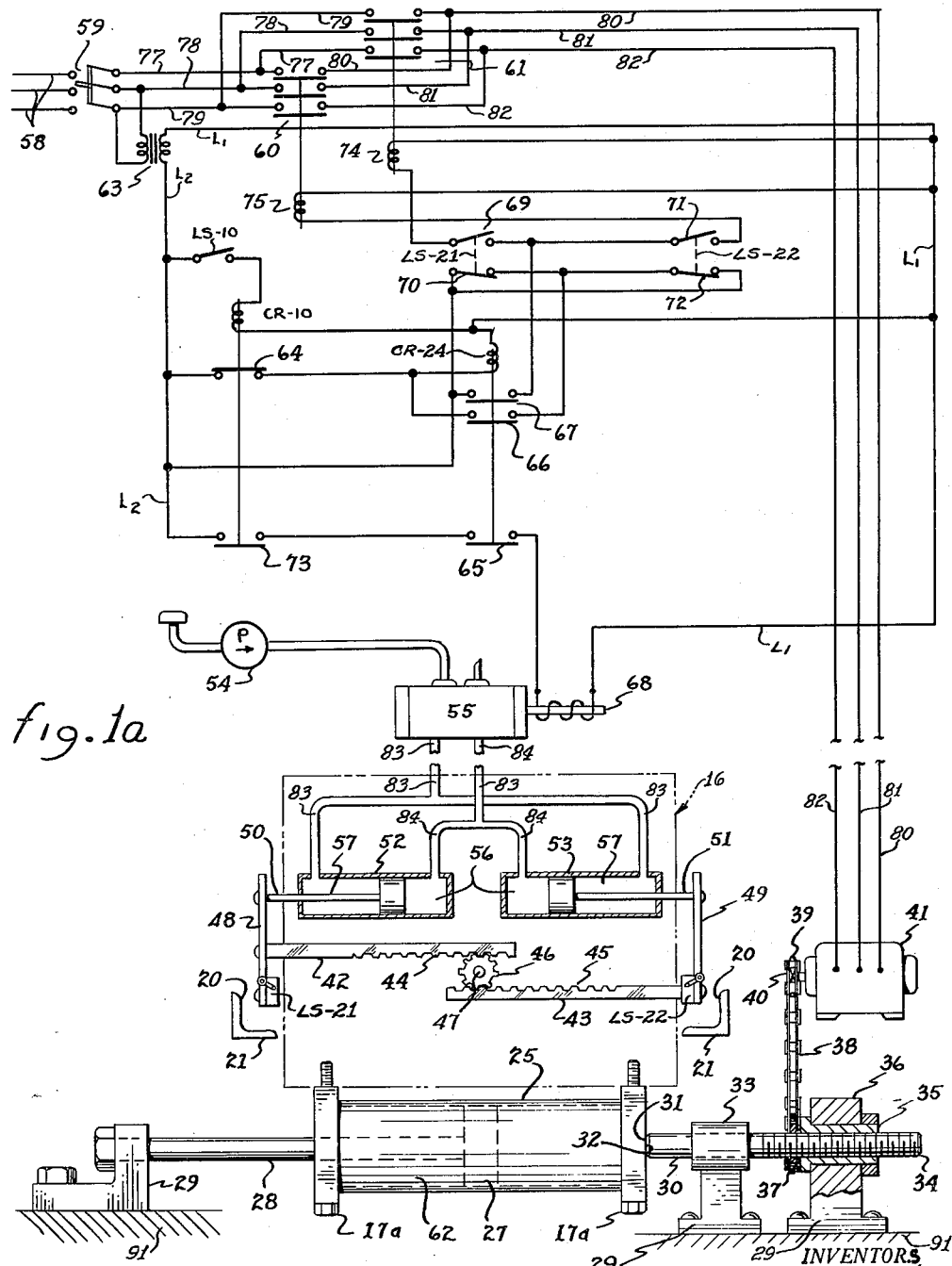
FIG. 1 is a diagram showing the arrangement and operation of the essential element of the probing device incorporating the features of this invention.
FIG. 1a is a diagram of the electrical control circuitry associated with the apparatus of FIG. 1.

In the manufacture of concrete blocks by means of automatic block machines, it is customary to handle the empty and load pallets to and from the usual pallet racks 15 and the receiving and discharge conveyors of the block machine (not shown) by means of a pallet handler. The pallet handler has a platen 16 which enters into the shelves of the rack 15 and picks up the empty pallets 17 and delivers them to the block machine receiving conveyor and then the platen picks up a loaded pallet 18 from the block machine and delivers it back to the same shelf of the rack 15 from which the empty pallet was last picked up.

A difficult problem arises in this operation in that the portable pallet racks are not always positioned at a predetermined location with respect to the fixed position of the receiving conveyor of the block machine from which the platen must pick up the loaded pallet and load them in the pallet racks. Also the vertical alignment and variation in width of the rack guideways presents a serious problem to rapid and automatic loading of the loaded pallets carried on the platen 16 in the racks without damage to the racks, the pallets and the uncured blocks on the pallets due to misalignment of the pallet edges 19 with the side faces 20 of the guide rails 21.

The purpose of the present invention is to provide a probing and sensing device carried on the platen 16 on a pallet handler frame 29 for movement in vertical and horizontal directions as is customary for pallet handler frames which engages the side faces 20 of the guide rails 21 of the rack 15 when the platen 16 is inserted into a shelf of the rack, and at that time, prior to engagement of the platen 16 with the top surface 22 of the pallet, make corrective sidewise positioning of the centerline 23 of the platen 16 with the centerline 24 of the rack shelf so that when the platen returns from the block machine with the loaded pallet it will be accurately positioned within the rack shelf and with centerlines 23 and 24 in alignment.

To this end there is provided a suitable actuating device for laterally shifting the platen 16 relative to the side faces 20 of the rack guide rails 21 and which actuating device may also be used to transport the platen to and from the rack and the receiving and discharge conveyors of the block machine. This actuating device may take the form of a fluid pressure cylinder 25 connected to the platen 16 through the cross movement frame 103, rack shaft 108, downwardly extending frame 114 which carries the platen 16. During the probing operations forming the subject matter of this invention these members 103, 108 and 114 form a rigid structure with the platen 16 so that at this time of probing the cylinder 25 in effect is rigidly connected to the platen 16 which is diagrammatically illustrated in FIG. 1 by suitable bolts 17a and having a piston 27 and piston rod 28 suitably connected to the carriage 91 by bracket 29 of the pallet handler by brackets 29 which may have various well known relatively movable elements, not shown, to manipulate the platen between the pallet rack and the block machine.

An adjustable abutment stop bar 30 has an abutment surface 31 engaging an abutment surface 32 fixed on the platen 16 to limit relative movement between the piston 27 and the cylinder 25. The stop bar 30 is slidably mounted in a suitable guide bracket 33 fixed to the pallet handler frame 29 and has to its rear end a screw portion 34 threadedly engaging in a rotatable nut 35 suitably journaled against axial movement in the bracket 36 fixed to the frame 29 of the pallet handler. A sprocket 37 is fixed to the nut 35 over which operates a chain 38 connected to the sprocket 39 on the shaft 40 of the reversible drive motor 41 carried on the frame 29.

On the platen 16 there is provided a pair of oppositely laterally movable probe bars 42 and 43 each having facing rack teeth 44 and 45 respectively, which engage an idler pinion 46 journaled on a pin 47 fixed to the platen 16. To the outer ends of the probe bars 42 and 43 are fixed the respective probe finger pieces 48 and 49 each of which are connected to the respective piston rods 50 and 51 of the probe finger actuating cylinders 52 and 53 fixed to the platen 16. Fluid pressure to actuate the probe cylinders 52 and 53 may be derived from a suitable fluid pressure source such as the pump 54 which is connected to the control valve 55 for applying fluid pressure through lines 84 and 83 to either pressure chambers 56 or 57 of the cylinders 52 and 53.

The power supply for energizing the reversible adjusting screw motor 41 is derived from the usual three phase A.C. power supply lines 58 connected through the main disconnect switch 59 to leads 77, 78 and 79 to the forward power contacts 60 and the reverse power contacts 61, FIG. 1. Leads 80, 81 and 82 are connected to the reversible drive motor 41. With fluid pressure applied to the pressure chamber 62 of the adjusting cylinder 25 by suitable means, not shown, the platen 16 is yieldingly held against the abutment surface 31 of the stop bar 30. Control current power is derived from the usual control current transformer 63 which supplies current to the leads L-1 and L-2.

Figure 2:
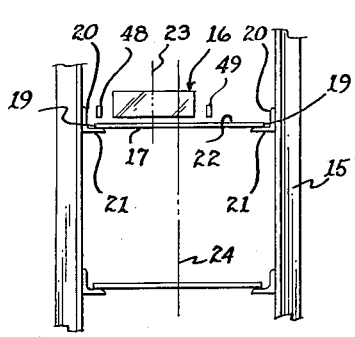
FIG. 2 is an enlarged view showing the position of the pallet rack guide rails, pallet handler platen, and probe fingers at the time of initial entry of the platen into the rack to pick up an empty pallet.

When the platen 16 moves longitudinally into the pallet racks 15 as shown in FIG. 2, a limit switch LS-10, FIG. 1a, is closed, but just prior to this, control relay CR-24 is energized from lead L-2 through normally closed contact 64 of CR-10, and normally open contacts 65 of CR-24 closes, as do normally open contacts 66 and 67 of this relay. Also at this time, prior to closing of LS-10, the coil 68 of control valve 55 is deenergized so that fluid pressure is applied through lines 83 to pressure chambers 57 of the probe actuating cylinders 52 and 53 to hold the probe fingers 48 and 49 and the respective limit switches LS-21 and LS-22 carried thereon in non-engaged position so that limit switch LS-21 has its contact 69 normally open and its contact 70 normally closed while limit switch LS-22 has its contact 71 normally open and its contact 72 normally closed.

As can be seen by referring particularly to FIG. 1, when coil CR-24 is energized it is locked in through contacts 66 and 67 being closed and contacts 70 and 72 being closed so that when LS-10 closes energizing CR-10 opening contact 64, CR-24 remains energized through the contacts 70 and 72 recited. Closing LS-10 energizing CR-10 closes normally open contact 73 so that current flows through the now closed contact 65 of CR-24 energizing coil 68 of the valve 55.

Figure 3:
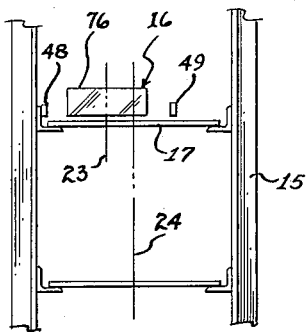
FIG. 3 is a view similar to FIG. 2 showing the initial engagement of one of the probe fingers with the side of a guide rail.
Figure 4:
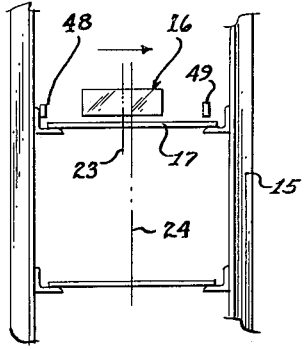
FIG. 4 is a view similar to FIG. 2 showing the corrective adjustment of the platen sidewise relative to the guide rails.
Figure 5:
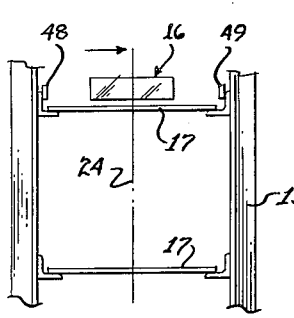
FIG. 5 is a view similar to FIG. 2 showing the platen as it arrives at centered position with both probe fingers in fully extended contact with both of the guide rails.
Figure 6:
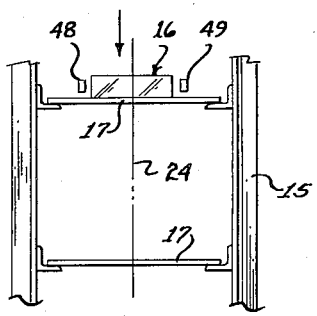
FIG. 6 is a view similar to FIG. 2 showing the platen down on top of the empty pallet and the probe fingers retracted.

At this time, FIG. 3, fluid pressure is then applied by valve 55 to the pressure chambers 56 of the probe cylinders 52 and 53 to simultaneously oppositely move both probe fingers outwardly until one of the fingers first engages a side face 20 of a guide rail of the pallet rack such, for example, as the probe finger 48 whereupon limit switch LS-21 is actuated to open its contact 70 and close its contact 69, energizing the operating coil 74 closing power contact 61 causing motor 41 to back screw 34 and stop bar 30 to the right, FIG. 1, allowing platen 16 to move to the right due to pressure in chamber 62 of cylinder. As the platen 16 moves to the right, FIG. 4, probe finger 48 remains in contact with the side face 20 of the guide rail 21 holding LS-21 actuated with its contact 70 open and contact 69 closed while probe bar 43 moves outwardly to the right due to the interaction of pinion 47 with the racks 44 and 45, the lateral shafting with motor 41 energized continuing until probe finger 49 engages the face 20 of the other guide rail, FIG. 5, whereupon LS-22 is now also actuated opening its contact 72 and closing its contact 71. When both contacts 70 and 72 are thus opened, motor 41 is deenergized and the centerline 23 of the platen now coincides with the centerline 24 of the pallet rack shelf. Also, with deenergized of CR-24, contact 65 opens deenergizing valve coil 68 to reverse pressure to cylinders 52 and 53 to thus retract the probe fingers, FIG. 6, and reset the limit switches LS-21 and LS-22 as shown in FIG. 1. Relay coil 75 would function in connection with contact 71 of limit switch LS-22 the same as coil 74 when the platen centerline 23 was on the opposite side, to the right in FIG. 2, of the centerline 24 of the pallet rack shelf.

Figure 7:
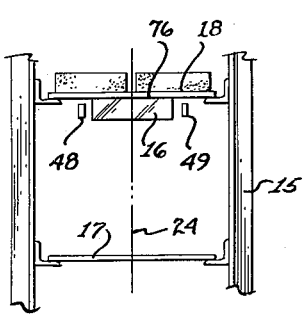
FIG. 7 is a view similar to FIG. 2 showing the platen returning a loaded pallet to the rack.

Having thus accurately established the position of the abutment stop surface 31 for the platen laterally of the faces 20 of the guide rails, the platen then picks up the empty pallet, usually by the usual magnetic pickup devices, not shown, and moves with the usual pallet handler to deliver the empty pallet to the block machine and pick up a loaded pallet properly centered on the top surface 76 of the platen and deliver it to the rack shelf as shown in FIG. 7. Since the lateral position of the platen has been previously established by the stop surface 31, the loaded pallet will enter in perfectly centered position as shown in FIG. 7.

Figure 8:
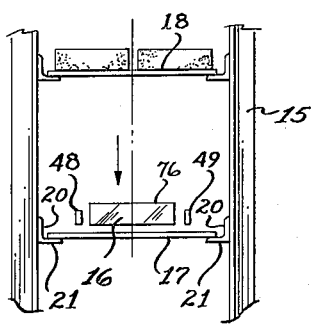
FIG. 8 is a view similar to FIG. 2 showing the platen lowered to the next shelf.
Figure 9:
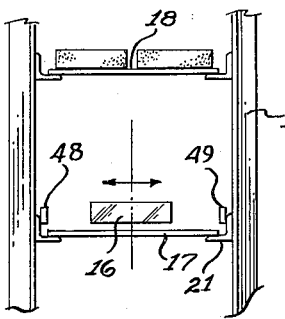
FIG. 9 is a view similar to FIG. 2 showing the probing and positioning of the platen sidewise relative to the guide rails of the next shelf.
Figure 10:
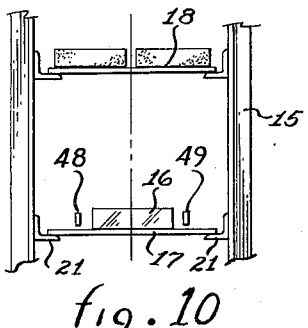
FIG. 10 is a view similar to FIG. 2 showing the platen positioned ready to pick up the empty pallet.

The platen may then step downwardly as shown in FIG. 8 preparatory to removing the next empty pallet and delivering a loaded one to that shelf. In some cases where the guideways for each shelf lack uniform width or vertical alignment the probing operations above, FIGS. 9 and 10, may be repeated for each shelf served by the platen if required.

Referring particularly to FIGS. 11 and 12, there is shown a typical block machine pallet handler to which the above described apparatus is particularly well adapted comprising a main frame 85 including a pair of spaced horizontal rails 86 and 87 supported on suitable upright standards 88 and 89 above the ground level 90. A carriage indicated at 91 comprising the transverse side rail members 92 and 93 and the end members 94 and 95 rigidly fixed to the outer ends of the members 92 and 93 is transportably carried on suitable rollers 96a carried on shafts 96 and 97 suitably journaled in the frame 91 and running along on the rails 86 and 87. A suitable reversible electric drive motor 98 mounted on the carriage 91 has a drive shaft 99 and a pulley 100 fixed thereon over which operates the belt 101 which in turn operates over a pulley 102 fixed to the shaft 97 so that the motor 98 when suitable energized traverses the carriage 91 to the right or left, FIGS. 1 and 2, on the frame 85 of the machine.

A cross movement frame indicated generally at 103 comprises the side members 104 and 105 and connecting pieces 106 and 107 transportably carried on rollers 106a journaled on suitable shafts 107a fixed to the cross movement frame 103. The fluid pressure cylinder 25 has its piston rod 28 connected at 29 to the carriage 91. The cylinder is connected to the platen 16 preferably by apparatus comprising a vertically disposed rack shaft 108 which is journaled against axial movement in the cross movement frame 103 and is rocked back and forth by a fluid cylinder 109 fixed on the cross movement frame 103 and having a piston rod 110 to which is fixed a rack 111 which is in mesh with the rack pinion 112 fixed to the rack shaft 108, so that by energizing the cylinder 109 the rack shaft 108 may be rotated clockwise or counterclockwise, FIG. 11, as required or to secure the platen in rigid position on the cross movement frame when the probing apparatus is being utilized.

The platen 16 may also have up-and-down movement for various shelf heights to be probed, if required. There may thus be provided in fixed position on the lower end of the rack shaft 108 a top plate 113 is fixed to a downwardly extending frame 114 upon which is vertically reciprocable the platen 16 by suitable guide rollers 115. An elevating motor 116 carried on the frame 114 drives a suitable reduction unit 117 also fixed to the frame 114 which is adapted to wind up or unwind the lifting chain 118a which passes down over the idler sprocket 118 journaled on the frame 114 and has its lower end fixed to the platen 16 so that by appropriately energizing the motor 116 the platen 16 may be raised and lowered relative to the shelves in the pallet rack 15 as required. The pallet handler receives loaded pallets 22 from the discharge conveyor 119 of the block machine and presents empty pallets to the receiving conveyor 120 of the block machine, transferring them back and forth from the pallet rack 15 in a well known manner as shown in Patent 2,896,800 referred to above. The probing device forming the essential part of this invention provides the means for aligning the loaded pallets for proper entrance in the rails 21 of the pallet rack 15 as described.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A probing device for positioning a pallet handler platen relative to a pallet rack having space pallet supporting guideways including vertically disposed side faces, a pair of power actuable oppositely laterally reciprocatable probe fingers on said platen adapted to be moved from a retracted position outwardly to engage said vertically disposed side faces, a movable abutment surface on the pallet handler frame for limiting lateral movement of said platen relative to said guide rails, power means on said frame for adjusting said movable abutment surface, and sensing devices on the outer ends of said probe fingers adapted to engage said side faces to regulate the operation of said power means.

2. In a device as set forth in claim 1 wherein said sensing devices include means for energizing said power means when one of said sensing devices are contacting a guide face, and means to deenergize said power means when both of said sensing devices are in engagement with said guide faces.

3. In a device as set forth in claim 1 wherein further means are provided to yieldingly hold said platen against said stop and to yieldingly activate said probe fingers outwardly into engagement with said guide faces during the operation of said power means while adjusting said movable abutment surface.

4. A probing device for a pallet handler having, a frame, a platen movable on said frame laterally relative to a pallet rack shelf defined by spaced guide rails having vertically disposed side faces, means having an adjustable abutment surface mounted on said frame to limit said lateral movement of said platen, reversible power means for adjusting said adjustable abutment surface means, power means for yieldingly holding said platen against said abutment surface, a pair of oppositely laterally reciprocatable probe bars on said platen, probe fingers on the outer ends thereof adapted to engage said side faces of the pallet rack guideways, facing rack teeth on said probe bars, an idler pinion journaled on said platen engaging the rack teeth of both of said probe bars, power means on said platen for reciprocating said probe bars, a source of power for actuating said probe bars, a control device interconnected between said source of power and said power means for actuating said probe bars, and an electric circuit connected to said reversible power means for adjusting said abutment surface and the power means for reciprocating said probe bars including a limit switch on the end of each of said probe fingers actuable when a finger engages a vertical side face of a guide rail of said pallet rack.

5. In a probing device for a pallet handler as set forth in claim 4 when said limit switches are arranged in said circuit so that actuation of any one of said limit switches upon engagament with a side face will cause operation of said reversible power means to move said abutment surface away from the side face contacted and to continue said movement until both limit switches are actuated by engagement with said side faces whereupon said reversible power means is deenergized to hold said abutment surface at the adjusted position.

6. In a probing device as set forth in claim 5 when said circuit includes means for energizing said control device for the power means for actuating said probe bars to cause retraction of said probe bars when both of said limit switches are actuated.

References Cited in the file of this patent

UNITED STATES PATENTS

| | | |
|---|---|---|
| 1,518,278 | Schroeder | Dec. 9, 1924 |
| 1,941,986 | Janson | Jan. 2, 1934 |
| 2,612,276 | Claytor | Sept. 30, 1952 |
| 2,709,012 | Lessard | May 24, 1955 |
| 2,730,251 | Schutt | Jan. 10, 1956 |
| 2,803,356 | Thomas | Aug. 20, 1957 |
| 2,896,800 | Thomas et al. | July 28, 1959 |